United States Patent [19]
Scrosati et al.

[11] Patent Number: 5,645,960
[45] Date of Patent: Jul. 8, 1997

[54] THIN FILM LITHIUM POLYMER BATTERY

[75] Inventors: Bruno Scrosati, Rome, Italy; Richard A. Marsh, Tipp City; Lawrence G. Scanlon, Jr., Fairborn, both of Ohio

[73] Assignee: The United States of America as represented by the Secretary of the Air Force, Washington, D.C.

[21] Appl. No.: 446,090

[22] Filed: May 19, 1995

[51] Int. Cl.[6] .................................................. H01M 2/04
[52] U.S. Cl. .......................... 429/219; 429/192; 429/218; 429/220
[58] Field of Search ................................ 429/190, 191, 429/218, 220, 219

[56] References Cited

U.S. PATENT DOCUMENTS

| | | | |
|---|---|---|---|
| 4,730,383 | 3/1988 | Balkanski | 29/623.5 |
| 5,035,965 | 7/1991 | Sangyoji et al. | 429/124 |
| 5,252,413 | 10/1993 | Alamgire et al. | 429/192 |
| 5,302,474 | 4/1994 | Shackle | 429/192 |
| 5,324,599 | 6/1994 | Oyama et al. | 429/192 |
| 5,350,645 | 9/1994 | Lake | 429/124 |
| 5,350,646 | 9/1994 | Armand et al. | 429/192 |
| 5,354,631 | 10/1994 | Chaloner-Gill et al. | 429/137 |
| 5,360,686 | 11/1994 | Peled et al. | 429/121 |

OTHER PUBLICATIONS

Proc. Electroch. Soc. (1980), 80–4 (Proc. Symp. Power Sources Biomed. Implantable Appl. Ambient Temp. Lithium Batteries, 1971, 283–94. Passevini Bi et al.

Passerini et al. "New Thin Layer Solid State Lithium Polymer Batteries", J. Electrochem. Soc., vol. 141, No. 7 Jul. 1994 pp. L80–L81.

Chem. Ab. 95:69771, "Cathides in Diff. Organic Electrolytes for Lithium Button Cells" 1980 (Abstract Only).

S. Passerini, S. Loutzky, B. Scrosati, "New Thin–Layer Solid State Lithium Polymer Batteries" *J. Electrochem. Soc.*, vol. 141, No. 7, Jul. 1994, pp. L80–L81.

F. Croce, F. Gerace, G. Dautzemberg, S. Passerini, G. Appetechhi, B. Scrosati, "Synthesis and Characterization of Highly Conducting Gel Electrolytes", *Electrochimica Acta*, vol. 39, No. 14, pp. 2187–2194, 1994 (only pp. 2187–2188 are enclosed) (In press at the time the Passerini article was published) Month n/a.

Burris B. Cunningham, "Transition Elements", McGraw–Hill Encyclopedia of Science and Technology, 6th Edition, vol. 18, pp. 483–484, (no month given), 1987, McGraw–Hill Book Company, New York.

*Primary Examiner*—M. Nuzzolillo
*Attorney, Agent, or Firm*—Charles E. Bricker; Thomas L. Kundert

[57] ABSTRACT

A solid state electrochemical cell comprising:
(a) an electrolyte comprising a polymeric matrix, an inorganic salt and a solvent;
(b) an anode comprising a thin film of lithium metal or an alloy thereof; and
(c) a cathode comprising a polymeric matrix, a conductive carbon and a metal salt, $M_2ZO_4$, wherein M is Ag or Cu and Z is W, Mo or Cr.

11 Claims, 2 Drawing Sheets

THIN FILM LITHIUM POLYMER BATTERY

RIGHTS OF THE GOVERNMENT

The invention described herein may be manufactured and used by or for the Government of the United States for all governmental purposes without the payment of any royalty.

FIELD OF THE INVENTION

This invention relates generally to batteries and more particularly to thin batteries constructed with polymer films.

BACKGROUND OF THE INVENTION

Advancements in semiconductor technology have led to the production of large scale integrated circuits which have brought about a revolution in the electronics industry. Microelectronic components are now widely used in the production of a variety of electronic devices (i.e. computers, calculators, watches). Development of such miniature electronic instruments has demanded the evolution of batteries as miniature power supplies. This new generation of batteries must produce higher energy per unit volume and superior discharge characteristics as compared to traditional batteries.

Miniature batteries based on aqueous, non-aqueous and solid electrolytes are manufactured as power sources for microelectronic and portable electronic equipment. As an example, thin solid state batteries are often constructed with an anode formed of solid lithium, or an alloy of lithium, and a cathode constructed of a solid electrolyte. This type of battery has a long shelf life and operates efficiently over a wide temperature range.

These thin solid state batteries employ a polymeric electrolyte containing a suitable inorganic ion salt interposed between the cathode and the anode. Electrochemical cells containing a polymeric matrix may suffer from low ion conductivity and, accordingly, in order to maximize the conductivity of these materials, the matrix is generally constructed into a very thin film, i.e., on the order of about 25 to about 250 µm. As is apparent, the reduced thickness of the film reduces the total amount of internal resistance within the electrolyte thereby minimizing losses in conductivity due to internal resistance.

The majority, if not the totality, of lithium batteries under development use intercalation compounds as preferred cathode materials. The lithium-intercalation compound combination benefits from high cyclability, but suffers from sloping charge and discharge voltage profiles. What is desired is a high energy density battery with a constant discharge voltage that can be used, for example, in instrumentation and computer memory backup.

Accordingly, it is an object of the present invention to provide a thin film lithium polymer battery having a flat discharge curve.

It is another object of the present invention to provide a novel cathode material for thin film lithium polymer batteries.

Other objects and advantages of the present invention will be apparent to those skilled in the art.

SUMMARY OF THE INVENTION

In accordance with the present invention there is provided a solid state electrochemical cell comprising:
(a) an electrolyte comprising a polymeric matrix, an inorganic salt and a solvent;
(b) an anode comprising a thin film of lithium metal or an alloy thereof; and
(c) a cathode comprising a polymeric matrix, a conductive carbon and a metal salt, $M_2ZO_4$, wherein M is Ag or Cu and Z is W, Mo or Cr.

DETAILED DESCRIPTION OF THE INVENTION

Figure 1:
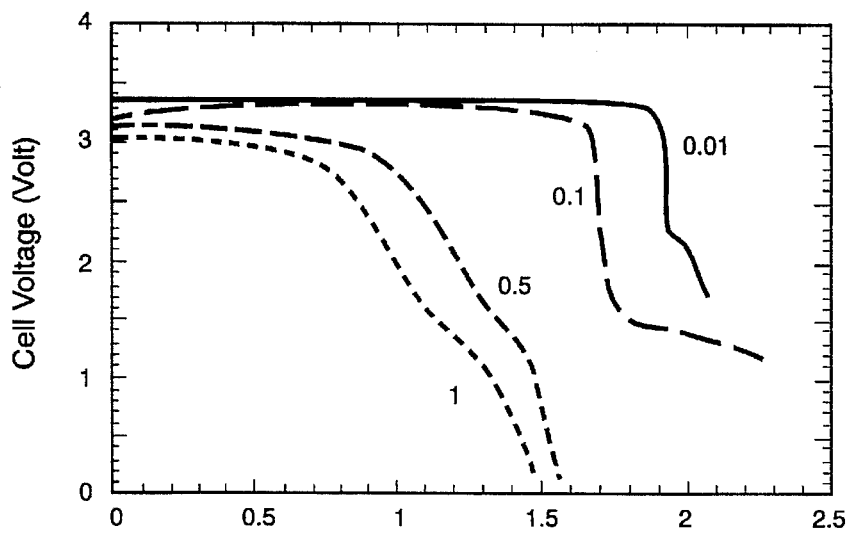
FIG. 1 illustrates typical discharge curves for a $Li-Ag_2WO_4$ polymer battery.

The electrolyte comprises a polymeric matrix, an inorganic salt and a solvent. Suitable organic polymeric matrices are well known in the art including, for example, polyethylene oxide, polypropylene oxide, polymethyl (methacrylate), polyacrylonitrile, polyethyleneimine, polyepichlorohydrin and polyethylene succinate. The inorganic salt can be any inorganic salt which is suitable for use in a solid electrolyte. Examples of suitable inorganic salts include, for example, $LiClO_4$, $LiI$, $LiSCN$, $LiBF_4$, $LiAsF_6$, $LiCF_3SO_3$, $LiN(CF_3SO_2)_2$, $LiPF_6$, $NaI$, $NaSCN$, and the like. The solid electrolytes also contain a solvent (plasticizer) which is typically added to the matrix in order to enhance the solubility of the inorganic ion salt in the solid electrolyte and thereby increase the conductivity of the electrochemical cell. Suitable solvents, well known in the art for use in such solid electrolytes include, for example, propylene carbonate, ethylene carbonate, gamma butyrolactone, tetrahydrofuran, glyme (dimethoxyethane), diglyme, triglyme, tetraglyme, dimethylsulfoxide, dioxolane, sulfolane and the like. In general, the electrolyte comprises about 15–25 weight percent polymeric matrix, about 70–80 weight percent solvent and about 3–10 weight percent salt.

The solid, solvent-containing electrolyte is typically formed in one of two methods. In one method, the solid matrix is first formed and then a requisite amount of this material is dissolved in a volatile solvent, such as tetrahydrofuran (THF). Requisite amounts of the inorganic ion salt and the electrolyte solvent (i.e., triglyme and the organic carbonate) are then added to the solution. This solution is then placed on the surface of a suitable substrate (e.g., the surface of a cathode) and the volatile solvent is removed to provide for the solid electrolyte.

In the other method, a monomer or partial polymer of the polymeric matrix to be formed is combined with appropriate amounts of the inorganic ion salt and the solvent. This mixture is then placed on the surface of a suitable substrate (e.g., the surface of the cathode) and the monomer is polymerized or cured (or the partial polymer is then further polymerized or cured) by conventional techniques (heat, ultraviolet radiation, electron beams, etc.) so as to form the solid, solvent-containing electrolyte.

The cathode comprises a polymeric matrix, a conductive carbon and a metal salt, $M_2ZO_4$, wherein M is Ag or Cu and Z is W, Mo or Cr. Suitable polymeric matrices are well known in the art including, for example, polyvinylchloride, polytetrafluoroethylene, polyethylene oxide, polypropylene oxide, polyacrylonitrile, polyethyleneimine, polyepichlorohydrin, polymethyl(methacrylate) and polyethylene succinate. The conductive material may be graphite or a carbon black, particularly acetylene black. The cathode can be fabricated in a manner similar to the methods described for fabrication of the electrolyte. In general, the cathode comprises about 70-80 weight percent of the metal salt, about 3-10 weight percent conductive carbon and about 15-25 weight percent polymeric matrix.

The following examples illustrate the invention:

EXAMPLE

Battery Fabrication $Ag_2WO_4$ was prepared by adding an aqueous solution of $AgNO_3$ to an aqueous solution of $Na_2WO_4$. The resulting precipitate was washed and dried at 60° C. under a nitrogen stream. Copper tungstate was prepared by heating an intimate mixture of copper oxide and tungsten oxide at 850° C. for 15 hours. The purity of the silver tungstate and the copper tungstate was determined by X-ray powder analysis.

The cathode membrane was formed by blending a mixture of the salt, i.e., silver tungstate or copper tungstate, and carbon with polyvinylclhoride (PVC) in a weight ratio of 75:5:20 (salt:carbon:PVC). The powder mixture was dispersed in tetrahydrofuran (THF), mixed and homogenized by magnetic stirring followed by ultrasonic stirring. The resulting suspension was cast on a glass substrate using a "doctor-blade" apparatus.

The polymer electrolyte was prepared by immobilizing an appropriate solution (e.g., a solution of lithium perchlorate in a mixture of propylene carbonate-ethylene carbonate) in a polyacrylonitrile (PAN). The lithium perchlorate and PAN were dissolved in a mixture of propylene carbonate (PC) and ethylene carbonate (EC) in a weight ratio of 16:23:56.5:4.5 ($PAN:PC:EC:LiClO_4$), at a temperature in the range of 100° to 110° C. The thus-obtained highly viscous solution was cast onto a glass sheet using a "doctor-blade" apparatus to obtain a solid electrolyte.

The $Li-Ag_2WO_4$ and $Li-CuWO_4$ batteries were fabricated in a laminated structure which included a lithium metal anode strip (optimized thickness 30 μm), a polymer electrolyte film (typical thickness, 100μm) and a cathode membrane (typical thickness, 400 μm). The batteries were assembled and sealed inside an argon-filled dry box. The electrochemical characteristics and performance of the batteries were evaluated with standard electrochemical instrumentation. All the experiments were driven and controlled by a computer.

Results $Li-Ag_2WO_4$ polymer battery: This battery has an open-circuit voltage (OCV) of 3.4V at room temperature, which is related to the following main discharge process:

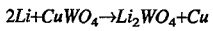

Figure 2:
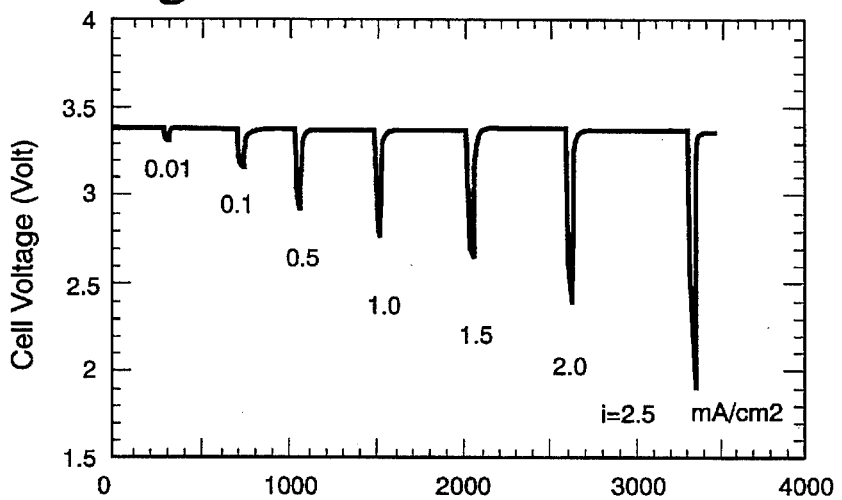
FIG. 2 shows the voltage response and voltage recovery of a $Li-Ag_2WO_4$ polymer battery following short discharge pulses.

FIG. 1 illustrates typical discharge curves for this battery run at various rates. At rates usually required for most microelectronic devices, for example, 0.01 mA cm$^{-2}$, the curve is exceptionally constant at about 3.3V for the entire discharge. FIG. 2 shows the voltage response and voltage recovery of the battery following short (30 sec) discharge pulses. This figure illustrates that the battery can sustain high current pulses with a fast recovery to the initial 3.4V OCV value.

Figure 3:
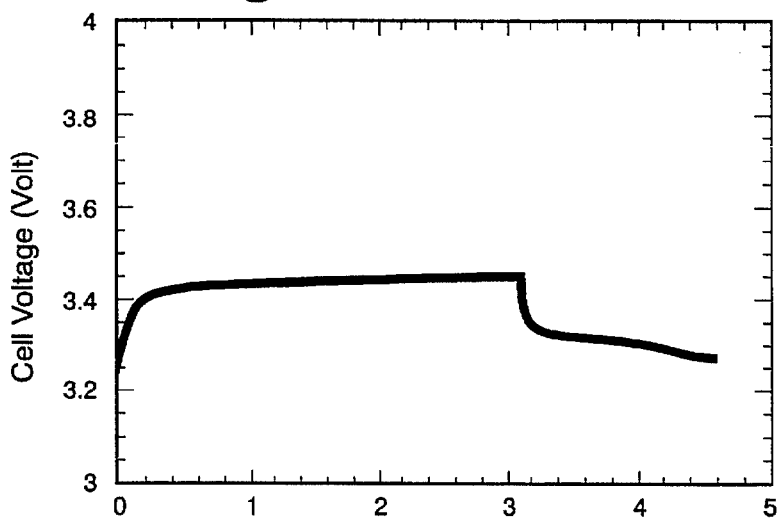
FIG. 3 shows repeated shallow cycling of a $Li-Ag_2WO_4$ polymer battery.

Although the $Li-Ag_2WO_4$ cell was designed as a primary battery, there are indications that partial rechargeability can be achieved. The battery can be repeatedly shallow cycled, i.e., 20% of the total capacity, with the trend illustrated in FIG. 3.

$Li-CuWO_4$ polymer battery: This battery has an open-circuit voltage (OCV) of 2.8V at room temperature, which is related to the following main discharge process:

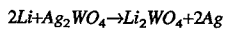

Figure 4:
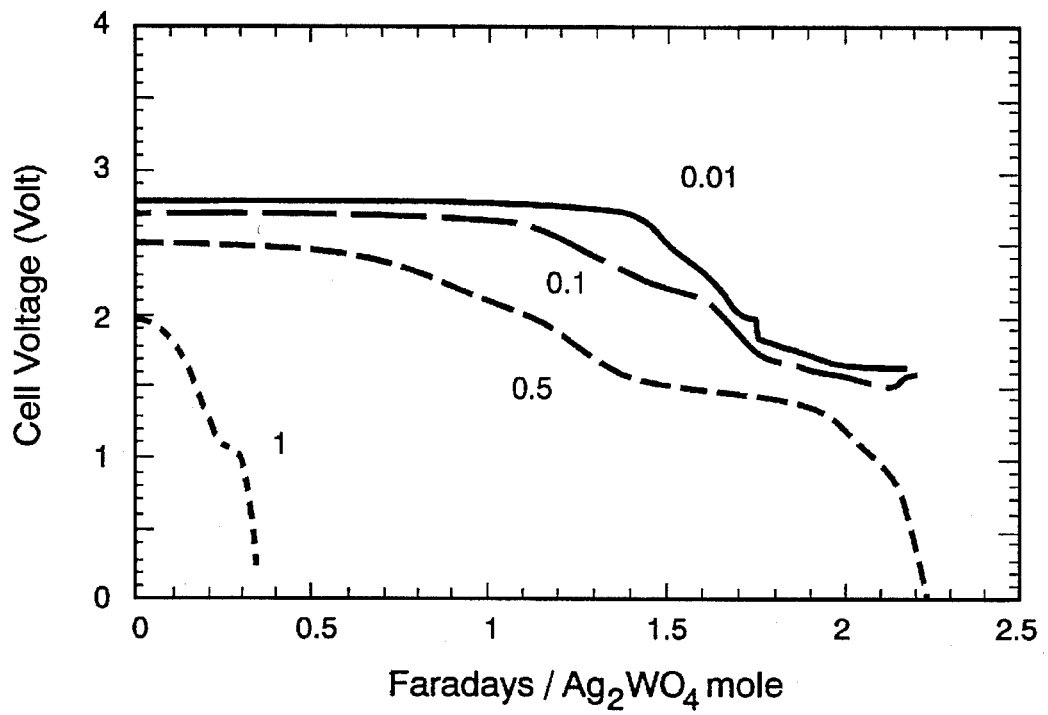
FIG. 4 illustrates typical discharge curves for a $Li-CuWO_4$ polymer battery.
Figure 5:
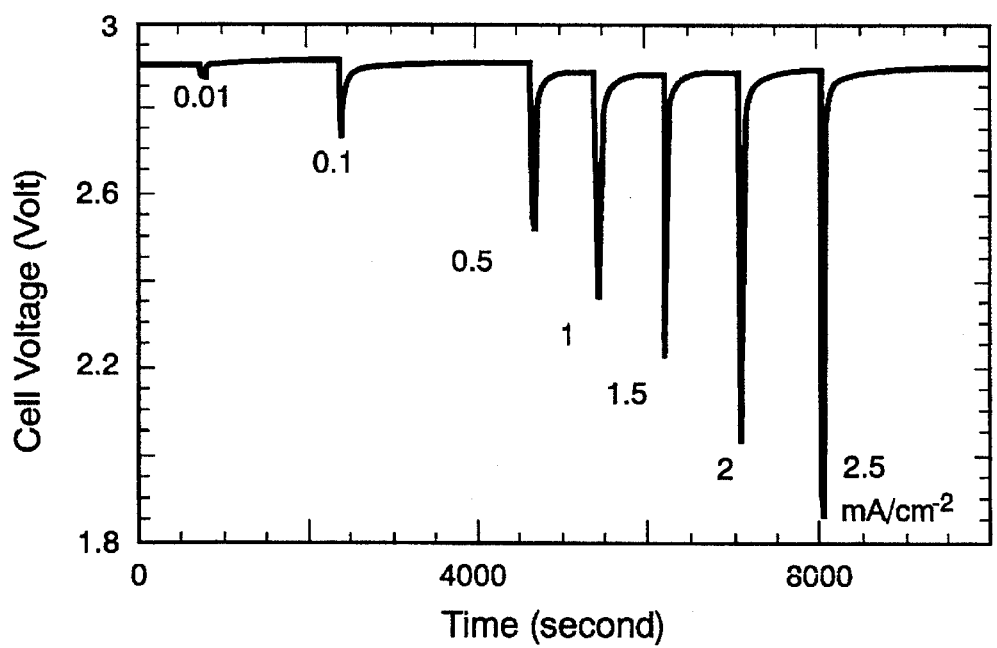
FIG. 5 shows the voltage response and voltage recovery of a $Li-CuWO_4$ polymer battery following short discharge pulses.

FIG. 4 illustrates typical discharge curves for this battery run at various rates. At rates usually required for most microelectronic devices, for example, 0.01 mA cm$^{-2}$, the curve is exceptionally constant at about 2.7V for the entire discharge. FIG. 5 shows the voltage response and voltage recovery of the battery following short (30 sec) discharge pulses.

Discussion

The discharge characteristics of these batteries are attractive. A flat constant voltage discharge is an ideal characteristic for power sources designed for the electronic market.

Various modifications may be made in the instant invention without departing from the spirit and scope of the appended claims.

We claim:

1. A solid state electrochemical cell comprising:
   (a) an electrolyte comprising a polymeric matrix, an inorganic salt and a solvent;
   (b) an anode comprising a thin film of lithium metal or an alloy thereof; and
   (c) a cathode comprising a polymeric matrix, a conductive carbon and a metal salt, $M_2ZO_4$, wherein M is Ag or Cu and Z is W, Mo or Cr.

2. The cell of claim 1 wherein said electrolyte comprises about 15-25 weight percent polymeric matrix, about 70-80 weight percent solvent and about 3-10 weight percent salt.

3. The cell of claim 1 wherein said polymeric matrix in said electrolyte is selected from the group consisting of polyethylene oxide, polypropylene oxide, polyacrylonitrile, polyethyleneimine, polyepichlorohydrin, polymethylmethacrylate and polyethylene succinate.

4. The cell of claim 3 wherein said polymeric matrix is polyacrylonitrile.

5. The cell of claim 1 wherein said salt in said electrolyte is selected from the group consisting of $LiClO_4$, LiI, LiSCN, $LiBF_4$, $LiAsF_6$, $LiCF_3SO_3$, $LiN(CF_3SO_2)_2$, $LiPF_6$, NaI and NaSCN.

6. The cell of claim 5 wherein said salt is $LiClO_4$.

7. The cell of claim 5 wherein said solvent in said electrolyte is a mixture of propylene carbonate and ethylene carbonate.

8. The cell of claim 1 wherein said cathode comprises about 70-80 weight percent of said metal salt, about 3-10 weight percent conductive carbon and about 15-25 weight percent polymeric matrix.

9. The cell of claim 1 wherein said polymeric matrix in said cathode is polyvinylchloride.

10. The cell of claim 1 wherein said metal salt in said cathode is $Ag_2WO_4$.

11. The cell of claim 1 wherein said metal salt in said cathode is $CuWO_4$.

* * * * *